US011934122B2

(12) United States Patent
Odaka

(10) Patent No.: US 11,934,122 B2
(45) Date of Patent: Mar. 19, 2024

(54) IMAGE FORMING APPARATUS AND IMAGE FORMING METHOD CAPABLE OF SUPPRESSING DETERIORATION IN IMAGE QUALITY CAUSED BY INSTABILITY OF FIXING TEMPERATURE

(71) Applicant: KYOCERA Document Solutions Inc., Osaka (JP)

(72) Inventor: Yoshiyuki Odaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/658,883

(22) Filed: Apr. 12, 2022

(65) Prior Publication Data

US 2022/0382187 A1 Dec. 1, 2022

(30) Foreign Application Priority Data

May 26, 2021 (JP) ................................ 2021-088183

(51) Int. Cl.
*G03G 15/20* (2006.01)

(52) U.S. Cl.
CPC ................................ *G03G 15/2039* (2013.01)

(58) Field of Classification Search
CPC .................................................. G03G 15/2039
See application file for complete search history.

(56) References Cited

U.S. PATENT DOCUMENTS

2007/0212083 A1* 9/2007 Ishikuro ............. G03G 15/5008
399/167
2017/0168433 A1* 6/2017 Okamoto ........... G03G 15/2042

FOREIGN PATENT DOCUMENTS

JP 2005234417 A 9/2005

* cited by examiner

*Primary Examiner* — Stephanie E Bloss
*Assistant Examiner* — Michael A Harrison
(74) *Attorney, Agent, or Firm* — Alleman Hall & Tuttle LLP

(57) ABSTRACT

An image forming apparatus includes a temperature sensor, a conveyance control portion, a driving control portion, an adjustment processing portion, and a stop processing portion. The temperature sensor is provided apart from a contact position between a fixing member and a transferred sheet to which a toner image has been transferred. The conveyance control portion continuously executes conveyance processes of conveying the transferred sheet. The driving control portion controls driving of a heater for heating the fixing member so that a temperature detected by the temperature sensor matches a predetermined temperature. The adjustment processing portion restricts the execution of the conveyance process until an adjustment process of adjusting a formation condition of the transferred sheet is completed. The stop processing portion stops the continuous execution of the conveyance processes when the restriction on the execution of the conveyance process continues beyond a predetermined timing.

9 Claims, 9 Drawing Sheets

IMAGE FORMING APPARATUS AND IMAGE FORMING METHOD CAPABLE OF SUPPRESSING DETERIORATION IN IMAGE QUALITY CAUSED BY INSTABILITY OF FIXING TEMPERATURE

INCORPORATION BY REFERENCE

This application is based upon and claims the benefit of priority from the corresponding Japanese Patent Application No. 2021-088183 filed on May 26, 2021, the entire contents of which are incorporated herein by reference.

BACKGROUND

The present disclosure relates to an electrophotographic image forming apparatus and an image forming method.

An electrophotographic image forming apparatus is provided with a fixing member such as a fixing belt for fixing a toner image transferred to a sheet onto the sheet, and a heater for heating the fixing member. Driving of the heater is controlled so that the temperature (hereinafter referred to as a "fixing temperature") at the contact position between the fixing member and a sheet to which a toner image has been transferred (hereinafter referred to as a "transferred sheet") becomes a predetermined reference temperature during continuous printing.

In addition, there is known an image forming apparatus that controls driving of the heater so that a temperature detected by a temperature sensor provided apart from the contact position becomes a target temperature set separately from the reference temperature. In this image forming apparatus, the target temperature is set so that the fixing temperature falls within a control range including the reference temperature by driving control of the heater. Specifically, the target temperature is set based on a positional relationship between the contact position, the heater, and the temperature sensor, a contact time between the transferred sheet and the fixing member, and an execution cycle of a conveyance process of conveying the transferred sheet to the contact position.

SUMMARY

An image forming apparatus according to an aspect of the present disclosure includes a fixing member, a heater, a temperature sensor, a conveyance control portion, a driving control portion, an adjustment processing portion, and a stop processing portion. The fixing member comes into contact with a toner image transfer surface of a transferred sheet to which a toner image has been transferred, and fixes the toner image on the transferred sheet. The heater heats the fixing member. The temperature sensor detects a temperature at a detection position separated from a contact position between the fixing member and the transfer surface. The conveyance control portion executes a conveyance process of conveying the transferred sheet to the contact position in a predetermined execution cycle. The driving control portion controls driving of the heater so that the temperature detected by the temperature sensor matches a target temperature set based on the execution cycle. The adjustment processing portion executes an adjustment process of adjusting a formation condition of the transferred sheet, and restricts the execution of the conveyance process until the adjustment process is completed. The stop processing portion stops continuous execution of the conveyance process by the conveyance control portion when the restriction on the execution of the conveyance process by the adjustment processing portion continues beyond an allowable limit timing that is an execution timing of the conveyance process or thereafter.

An image forming method according to another aspect of the present disclosure is executed by an image forming apparatus including: a fixing member configured to come into contact with a toner image transfer surface of a transferred sheet to which a toner image has been transferred, and fix the toner image on the transferred sheet; a heater configured to heat the fixing member; a temperature sensor configured to detect a temperature at a detection position separated from a contact position between the fixing member and the transfer surface, the method comprising the following conveyance control step, driving control step, adjustment step, and stop step. In the conveyance control step, a conveyance process of conveying the transferred sheet to the contact position is executed in a predetermined execution cycle. In the driving control step, driving of the heater is controlled so that the temperature detected by the temperature sensor matches a target temperature set based on the execution cycle. In the adjustment step, an adjustment process of adjusting a formation condition of the transferred sheet is executed and the execution of the conveyance process is restricted until the adjustment process is completed. In the stop step, continuous execution of the conveyance process by the conveyance control step is stopped when the restriction on the execution of the conveyance process by the adjustment step continues beyond an allowable limit timing that is an execution timing of the conveyance process or thereafter.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure will be described below with reference to the accompanying drawings. It is noted that the following embodiments are examples of embodying the present disclosure and do not limit the technical scope of the present disclosure.

[Configuration of Image Forming Apparatus 100]

First, a configuration of an image forming apparatus 100 according to an embodiment of the present disclosure will be described with reference to FIG. 1 and FIG. 2.

It is noted that, for convenience of description, the vertical direction in an installation state (the state shown in FIG. 1) in which the image forming apparatus 100 can be used is defined as an up-down direction D1. In addition, a front-rear direction D2 is defined assuming that the surface of the image forming apparatus 100 shown in FIG. 1 on the left side on the figure is the front side (front surface). In addition, a left-right direction D3 is defined with reference to the front side of the image forming apparatus 100 in the installation state.

The image forming apparatus 100 is a multifunction peripheral having a plurality of functions such as a facsimile function and a copy function in addition to a scan function for reading an image of a document sheet and a print function for forming an image on a sheet based on image data. The present disclosure may be applied to an image forming apparatus such as a printer, a facsimile apparatus, or a copier.

Figure 1:
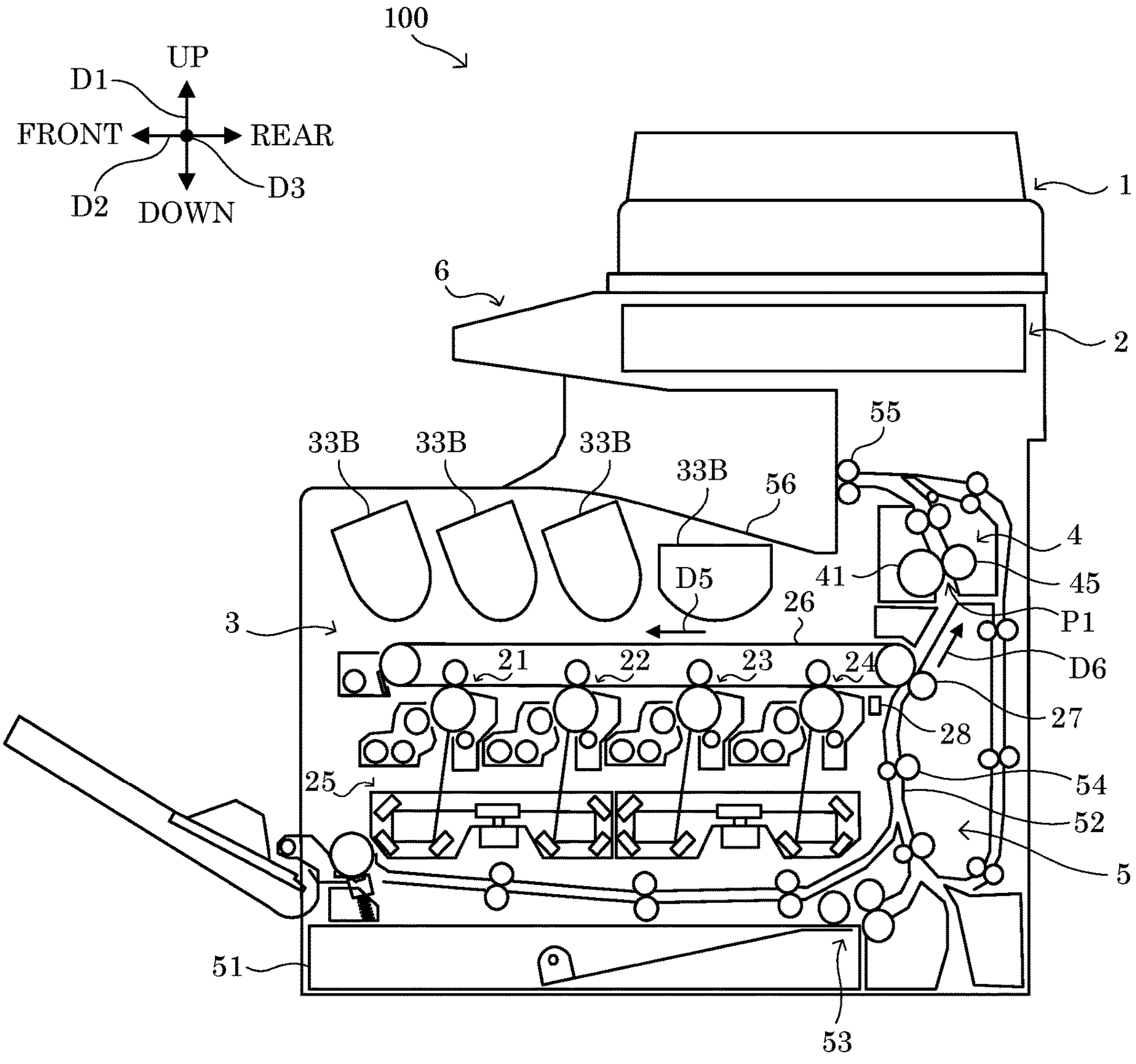
FIG. 1 is a cross-sectional view showing a configuration of an image forming apparatus according to an embodiment of the present disclosure.
Figure 2:
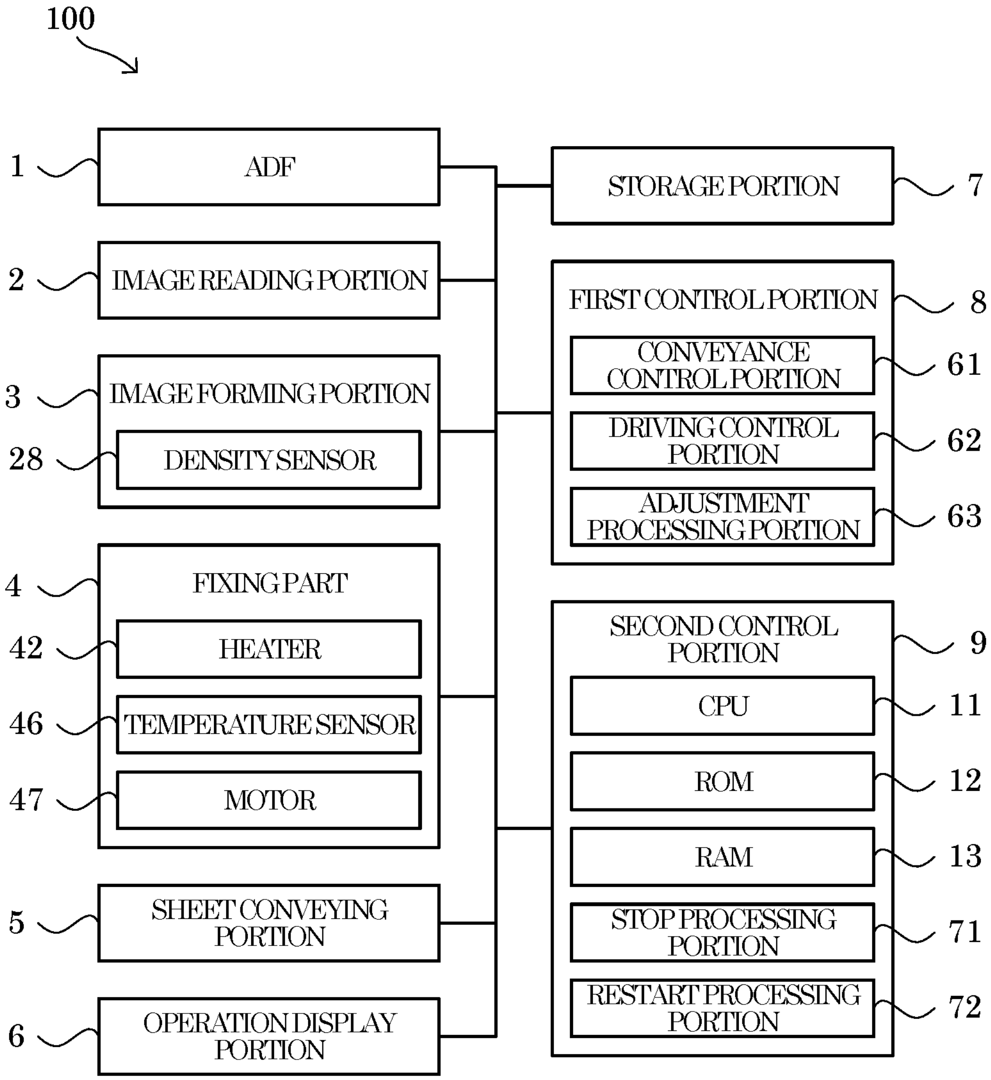
FIG. 2 is a block diagram showing a system configuration of the image forming apparatus according to the embodiment of the present disclosure.

As shown in FIG. 1 and FIG. 2, the image forming apparatus 100 includes an auto document feeder (ADF) 1, an image reading portion 2, an image forming portion 3, a fixing part 4, a sheet conveying portion 5, an operation display portion 6, a storage portion 7, a first control portion 8, and a second control portion 9.

The ADF 1 conveys a reading target document sheet to be read by the scanning function. The ADF 1 includes a document sheet loading portion, a plurality of conveying rollers, a document sheet holder, and a sheet discharge portion.

The image reading portion 2 implements the scan function. The image reading portion 2 includes a document sheet table, a light source, a plurality of mirrors, an optical lens, and a charge coupled device (CCD).

The image forming portion 3 and the fixing part 4 implement the print function. Specifically, the image forming portion 3 and the fixing part 4 form an image on a sheet using electrophotography. The image forming portion 3 forms a toner image and transfers the formed toner image to a sheet conveyed by the sheet conveying portion 5. The fixing part 4 fixes a toner image transferred to a sheet by the image forming portion 3 onto the sheet.

The sheet conveying portion 5 conveys a print target sheet.

The operation display portion 6 is a user interface of the image forming apparatus 100. The operation display portion 6 includes a display portion such as a liquid crystal display for displaying various types of information in response to a control instruction from the second control portion 9, and an operation portion such as an operation key or a touch panel for inputting various types of information to the second control portion 9 in response to a user's operation.

The storage portion 7 is a nonvolatile storage device. For example, the storage portion 7 is a storage device such as a nonvolatile memory including a flash memory, an EEPROM, and the like, a solid state drive (SSD), or a hard disk drive (HDD). The storage portion 7 stores data of a plurality of images to be continuously printed by the image forming apparatus 100.

The first control portion 8 controls the operations of the image forming portion 3, the fixing part 4, and the sheet conveying portion 5. The first control portion 8 is composed of an electronic circuit such as an integrated circuit (application specific integrated circuit (ASIC)) or a digital signal processor (DSP).

The second control portion 9 comprehensively controls the image forming apparatus 100. As shown in FIG. 2, the second control portion 9 includes a CPU 11, a ROM 12, and a RAM 13. The CPU 11 is a processor that executes various types of arithmetic processing. The ROM 12 is a nonvolatile storage device in which information such as control programs for causing the CPU 11 to execute various processes are stored in advance. The RAM 13 is a volatile or nonvolatile storage device used as a temporary storage memory (work area) for various processes executed by the CPU 11. In the second control portion 9, various control programs stored in the ROM 12 in advance are executed by the CPU 11. Thus, the second control portion 9 comprehensively controls the image forming apparatus 100.

[Configuration of Image Forming Portion 3]

Next, a configuration of the image forming portion 3 will be described with reference to FIG. 1 to FIG. 3. Here, FIG. 3 is a cross-sectional view showing a configuration of an image forming unit 24.

As shown in FIG. 1, the image forming portion 3 includes a plurality of image forming units 21 to 24, a laser scanning unit 25, an intermediate transfer belt 26, a secondary transfer roller 27, and a density sensor 28.

The image forming unit 21, the image forming unit 22, the image forming unit 23, and the image forming unit 24 are electrophotographic image forming units corresponding to Y (yellow), C (cyan), M (magenta), and K (black), respectively. As shown in FIG. 1, the image forming units 21 to 24 are arranged in the order of yellow, cyan, magenta, and black from the front side of the image forming apparatus 100 along the front-rear direction D2 of the image forming apparatus 100.

Figure 3:
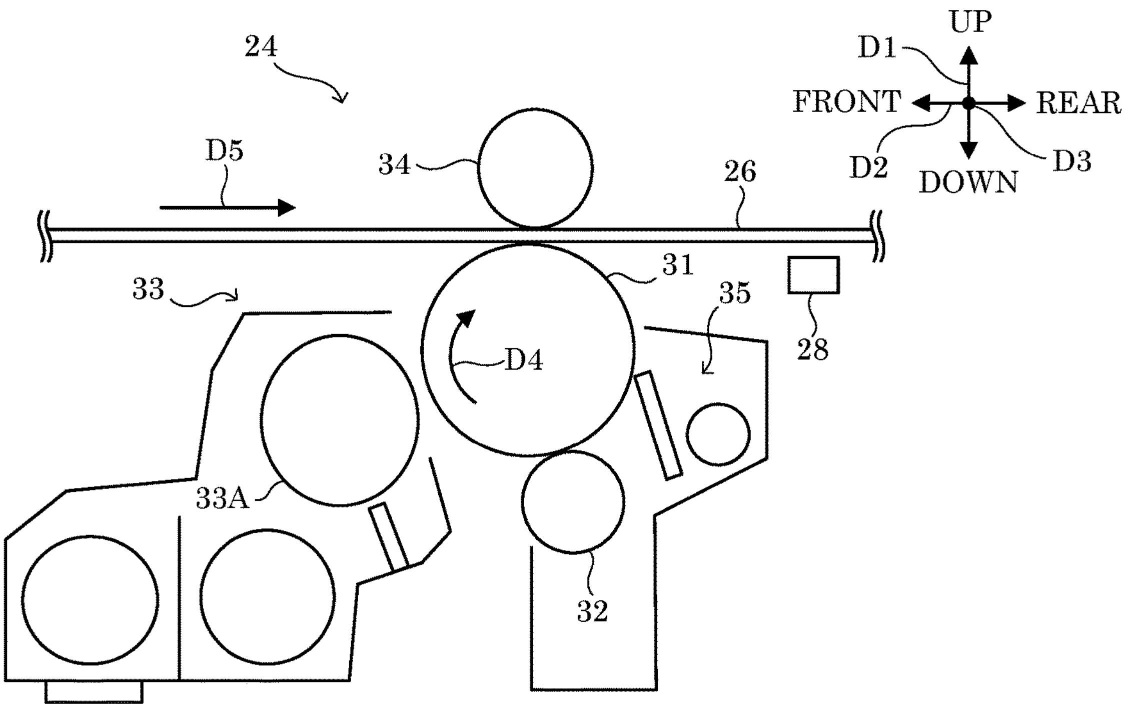
FIG. 3 is a cross-sectional view showing a configuration of an image forming unit of the image forming apparatus according to the embodiment of the present disclosure.

As shown in FIG. 3, the image forming unit 24 includes a photoconductor drum 31, a charging roller 32, a developing device 33, a primary transfer roller 34, and a drum cleaning member 35. In addition, each of the image forming units 21 to 23 has the same configuration as the image forming unit 24.

An electrostatic latent image is formed on the surface of the photoconductor drum 31. The photoconductor drum 31 rotates in a rotational direction D4 shown in FIG. 3 under rotational drive power supplied from a motor (not shown).

The charging roller 32 charges the surface of the photoconductor drum 31 under application of a preset charging voltage. The surface of the photoconductor drum 31 charged by the charging roller 32 is irradiated with light based on image data emitted from the laser scanning unit 25. Thus, an electrostatic latent image is formed on the surface of the photoconductor drum 31.

The developing device 33 develops the electrostatic latent image formed on the surface of the photoconductor drum 31 using a developer including toner. The developing device 33 includes a developing roller 33A (see FIG. 3) that supplies toner to the surface of the photoconductor drum 31 under application of a preset development bias voltage. A toner image is formed on the surface of the photoconductor drum 31 by the developing device 33. It is noted that the developing device 33 is replenished with toner from a toner container 33B (see FIG. 1).

Under application of a preset primary transfer voltage, the primary transfer roller 34 transfers the toner image formed on the surface of the photoconductor drum 31 to the intermediate transfer belt 26.

The drum cleaning member 35 removes toner remaining on the surface of the photoconductor drum 31 after the toner image transfer by the primary transfer roller 34.

The laser scanning unit 25 emits light based on image data toward the surface of the photoconductor drum 31 of each of the image forming units 21 to 24.

The intermediate transfer belt 26 is an endless belt member to which a toner image formed on the surface of the photoconductor drums 31 of each of the image forming units 21 to 24 is transferred. The intermediate transfer belt 26 is stretched with a predetermined tension by a drive roller and a stretching roller. The intermediate transfer belt 26 is rotated in a rotational direction D5 shown in FIG. 3 as the drive roller rotates under rotational drive power supplied from a motor (not shown).

Under application of a preset secondary transfer voltage, the secondary transfer roller 27 transfers the toner image transferred onto the surface of the intermediate transfer belt 26 to a sheet conveyed by the sheet conveying portion 5.

The density sensor 28 detects the density of the toner image transferred onto the outer peripheral surface of the intermediate transfer belt 26. For example, the density sensor 28 is a reflective type photosensor including a light emitting portion that emits light toward the outer peripheral surface of the intermediate transfer belt 26 and a light receiving portion that receives light emitted from the light emitting portion and reflected by the outer peripheral surface of the intermediate transfer belt 26. As shown in FIG. 1 and FIG. 3, the density sensor 28 is arranged downstream of the image forming unit 24 in the rotational direction D5 of the intermediate transfer belt 26 and upstream of the secondary transfer roller 27 in the rotational direction D5.

[Configuration of Sheet Conveying Portion 5]

Next, a configuration of the sheet conveying portion 5 will be described with reference to FIG. 1.

As shown in FIG. 1, the sheet conveying portion 5 includes a sheet feed cassette 51, a sheet conveying path 52, a sheet feed unit 53, a resist roller pair 54, a sheet discharge roller pair 55, and a sheet discharge tray 56.

The sheet feed cassette 51 contains print target sheets. For example, the sheet feed cassette 51 contains sheet members such as paper, coated paper, postcards, envelopes, and OHP sheets. The sheet feed cassette 51 has a lift plate for lifting up a plurality of sheets contained therein.

The sheet conveying path 52 is a path for moving sheets from the sheet feed cassette 51 to the sheet discharge tray 56 via the secondary transfer roller 27 and the fixing part 4. The sheet conveying path 52 is provided with a plurality of roller pairs including the resist roller pair 54 and the sheet discharge roller pair 55. In the sheet conveying path 52, a sheet carried out from the sheet feed cassette 51 is conveyed in a conveying direction D6 (see FIG. 1) toward the sheet discharge tray 56 by the roller pairs. The sheet conveying path 52 is formed by a pair of conveyance guide members provided in the housing of the image forming apparatus 100.

The sheet feed unit 53 feeds sheets contained in the sheet feed cassette 51 one by one to the sheet conveying path 52. The sheet feed unit 53 includes a pickup roller, a sheet feed roller, and a retard roller. The pickup roller rotates in contact with the upper surface of the uppermost sheet of the sheets lifted by the lift plate of the sheet feed cassette 51, thereby feeding the sheet to the sheet feed roller. The sheet feed roller rotates in contact with the upper surface of the sheet fed by the pickup roller, thereby feeding the sheet to the sheet conveying path 52. The retard roller is biased from below the sheet feed roller toward the sheet feed roller. When a plurality of overlapping sheets are fed by the pickup roller, the retard roller separates the sheets other than the uppermost layer from the overlapping sheets.

In accordance with the timing at which a toner image formed on the outer peripheral surface of the intermediate transfer belt 26 is conveyed to a transfer position where the toner image is transferred by the secondary transfer roller 27, the resist roller pair 54 conveys a sheet to the transfer position.

The sheet discharge roller pair 55 discharges a sheet on which the toner image has been fixed by the fixing part 4 to the sheet discharge tray 56.

[Configuration of Fixing Part 4]

Next, a configuration of the fixing part 4 will be described with reference to FIG. 2, FIG. 4, and FIG. 5.

Figure 4:
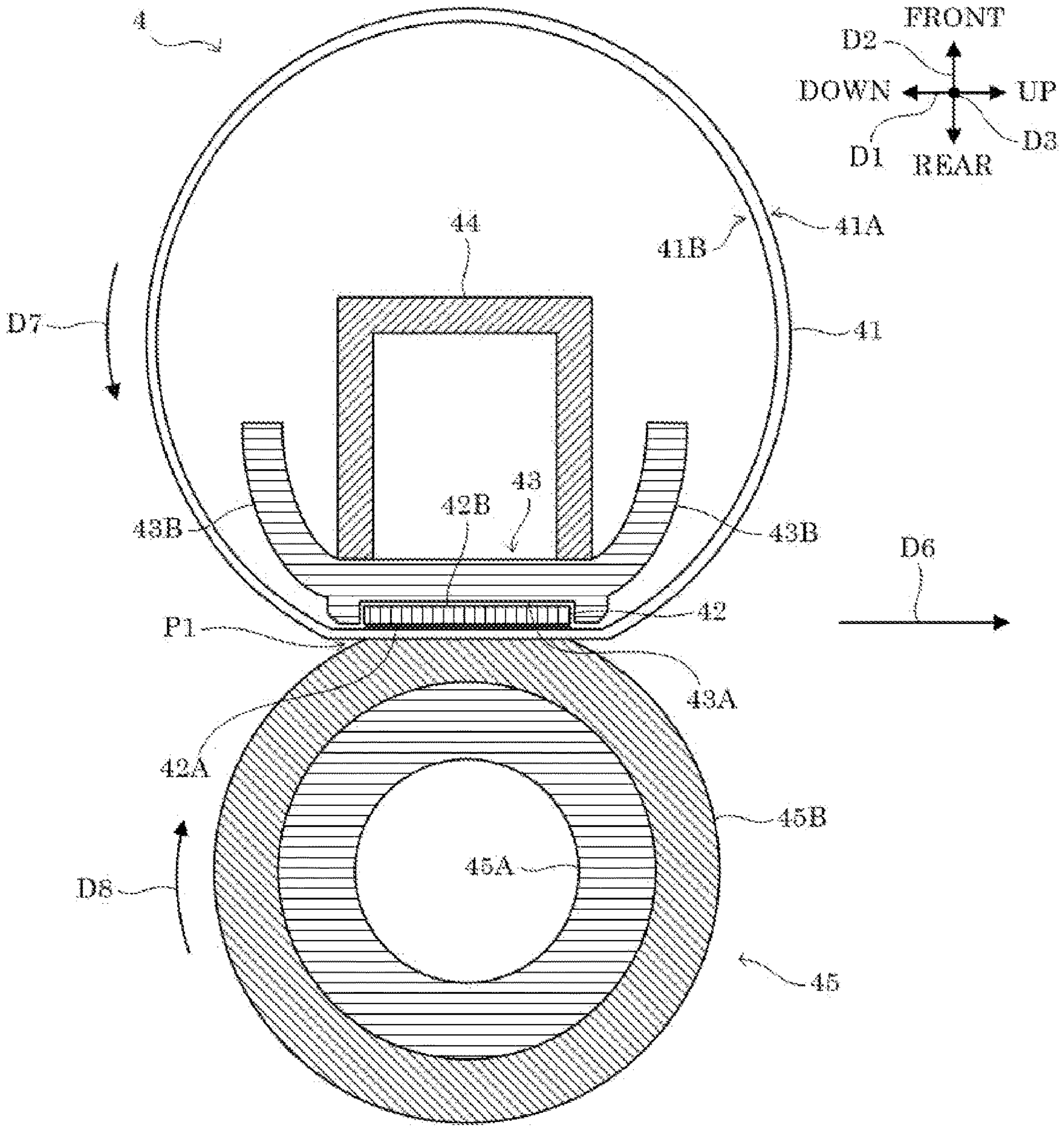
FIG. 4 is a cross-sectional view showing a configuration of a fixing part of the image forming apparatus according to the embodiment of the present disclosure.

As shown in FIG. 4, the fixing part 4 includes a fixing member 41, a heater 42, a heater support portion 43, a pressing member 44, and a pressure roller 45. In addition, as shown in FIG. 2, the fixing part 4 includes a temperature sensor 46 and a motor 47.

The fixing member 41 comes into contact with a sheet to which a toner image has been transferred by the image forming portion 3 (hereinafter referred to as a "transferred sheet") and fixes the toner image on the transferred sheet.

As shown in FIG. 4, the fixing member 41 is an endless belt-shaped member. The fixing member 41 is flexible. The fixing member 41 is sandwiched between the heater 42 and the pressure roller 45, and travels along a traveling direction D7 (see FIG. 4) following the rotation of the pressure roller 45.

The heater 42 heats the fixing member 41.

The heater 42 is formed in a flat plate shape extending in the left-right direction D3. The heater 42 is provided in contact with an inner peripheral surface 41B (see FIG. 4) of the fixing member 41 at a position facing, with the fixing member 41 interposed therebetween, the transferred sheet passing through a contact position P1 (see FIG. 4) between the fixing member 41 and the transfer surface of the transferred sheet.

Figure 5:
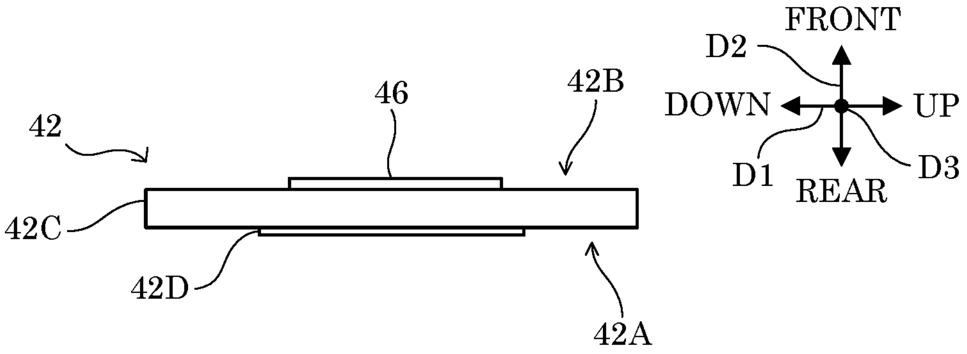
FIG. 5 is a side view showing a configuration of a heater of the image forming apparatus according to the embodiment of the present disclosure.

As shown in FIG. 5, the heater 42 includes a substrate 42C and a resistance heating element 42D. The substrate 42C is formed in a flat plate shape extending in the left-right direction D3. The resistance heating element 42D is mounted on a surface of the substrate 42C facing the inner peripheral surface 41B of the fixing member 41. The resistance heating element 42D is connected to a power supply (not shown) via a wiring pattern mounted on the facing surface. The resistance heating element 42D generates heat as a current supplied from the power supply flows therethrough.

The heater 42 is provided to face the pressure roller 45 with the fixing member 41 interposed therebetween. Specifically, the heater 42 is provided in such a posture that a first surface 42A in contact with the inner peripheral surface 41B of the fixing member 41 faces the shaft center of the pressure roller 45. It is noted that the first surface 42A is a surface formed by a surface of the substrate 42C on which the resistance heating element 42D is mounted and an outer surface of the resistance heating element 42D. In addition, the heater 42 is brought into contact with the inner peripheral surface 41B of the fixing member 41 with pressure by being pressed toward the pressure roller 45 by the pressing member 44.

The heater support portion 43 supports the heater 42. As shown in FIG. 4, a recess 43A into which the heater 42 can be fitted is formed in the heater support portion 43. The heater 42 is fitted into the recess 43A of the heater support portion 43.

In addition, the heater support portion 43 guides the fixing member 41 so that the fixing member 41 travels along a predetermined travel path. Specifically, the heater support portion 43 includes a pair of guide portions 43B (see FIG. 4) that contact the inner peripheral surface 41B of the fixing member 41 and guide the fixing member 41.

The pressing member 44 presses the heater support portion 43 toward the pressure roller 45. The pressing member 44 is provided in contact with the heater support portion 43 and is long in the left-right direction D3, which is the width direction of the fixing member 41. Both ends of the pressing member 44 in the longitudinal direction receive a biasing force from a biasing member (not shown) toward the pressure roller 45. Thus, the pressing member 44 presses the heater support portion 43 toward the pressure roller 45. As the heater support portion 43 is pressed toward the pressure roller 45, the heater 42 supported by the heater support portion 43 is also pressed toward the pressure roller 45.

The pressure roller 45 is provided in contact with an outer peripheral surface 41A of the fixing member 41. The pressure roller 45 includes a metal shaft portion 45A and an elastic layer 45B having elasticity formed on the outer periphery of the shaft portion 45A. The shaft portion 45A is rotatably supported by a pair of side plates provided in the housing of the image forming apparatus 100. Under rotational drive power supplied from the motor 47, the pressure roller 45 rotates in a rotational direction D8 (see FIG. 4). The contact position P1 is a position where the fixing member 41 and the transferred sheet come into contact with each other, as well as a position where the fixing member 41 and the pressure roller 45 come into contact with each other.

The temperature sensor 46 detects a temperature at a detection position separated from the contact position P1 (see FIG. 4) between the fixing member 41 and the transfer surface of the transferred sheet.

As shown in FIG. 5, the temperature sensor 46 is provided on a second surface 42B of the heater 42 opposite to the first surface 42A that contacts the inner peripheral surface 41B of the fixing member 41. The temperature sensor 46 detects the temperature at the arrangement position. That is, the detection position is the position where the temperature sensor 46 is arranged.

For example, the temperature sensor 46 is an electric circuit including a thermistor, and outputs an electric signal corresponding to the temperature of the arrangement position. The electric signal output from the temperature sensor 46 is input to a driving control portion 62.

The motor 47 supplies rotational drive power to the pressure roller 45.

[Configuration of First Control Portion 8]

Next, a configuration of the first control portion 8 will be described in more detail with reference to FIG. 2.

As shown in FIG. 2, the first control portion 8 includes a conveyance control portion 61, a driving control portion 62, and an adjustment processing portion 63.

The conveyance control portion 61 executes a conveyance process of conveying the transferred sheet to the contact position P1 (see FIG. 4) in a predetermined execution cycle.

Specifically, in the conveyance process, the image forming units 21 to 24 (see FIG. 1), the laser scanning unit 25, and the intermediate transfer belt 26 are used to form a toner image on the outer peripheral surface of the intermediate transfer belt 26. In addition, in the conveyance process, the sheet conveying portion 5 is used to convey a sheet to the transfer position in accordance with the timing at which the toner image formed on the outer peripheral surface of the intermediate transfer belt 26 is transferred to the transfer position to which the toner image is transferred by the secondary transfer roller 27. Also, in the conveyance process, the secondary transfer roller 27 is used to transfer a toner image formed on the outer peripheral surface of the intermediate transfer belt 26 to a sheet conveyed by the sheet conveying portion 5, and the sheet (the transferred sheet) is conveyed to the contact position P1.

In addition, the conveyance control portion 61 measures the elapsed time from the start of execution of the conveyance process, and executes the next conveyance process when the measured elapsed time reaches a reference time corresponding to the execution cycle. Namely, an execution timing of the conveyance process is when the reference time has elapsed from the start of the previously executed conveyance process.

The driving control portion 62 controls the driving of the heater 42 so that the temperature at the contact position P1 (hereinafter referred to as a "fixing temperature") falls within a control range including a predetermined reference temperature.

Here, the reference temperature is a temperature determined in advance so that the image quality of the toner image fixed on the sheet by the fixing part 4 becomes better than a predetermined level. In addition, the reference temperature is a temperature at which the toner transferred to the sheet can be melt-fixed to the sheet without failure.

Specifically, the driving control portion 62 controls the driving of the heater 42 so that the temperature detected by the temperature sensor 46 matches a target temperature set based on the execution cycle.

Here, the target temperature is a temperature set separately from the reference temperature. The target temperature is set in advance so that the fixing temperature falls within the control range by driving control of the heater 42 based on the target temperature. Specifically, the target temperature is set based on the positional relationship between the contact position P1, the resistance heating element 42D of the heater 42, and the temperature sensor 46, the material of the sheet, the size of the sheet, the contact time between the transferred sheet and the fixing member 41, the execution cycle, and the like.

For example, the driving control portion 62 executes driving control including a warm-up step, a temperature maintenance step, and an operation stop step.

The warm-up step is a step of raising the detected temperature to the target temperature beyond the lower limit of a specific range including the target temperature. The warm-up step is executed when a first signal providing an instruction to start execution of the driving control is input from the conveyance control portion 61.

For example, the warm-up step is executed by the following procedure.

First, power supply to the heater 42 is started with the pressure roller 45 stopped, and the power supply to the heater 42 is controlled so that the detected temperature reaches the target temperature.

Next, power supply to the motor 47 is started, and the power supply to the motor 47 is controlled so that the pressure roller 45 rotates at a predetermined first speed. Thus, the fixing member 41 rotates accordingly, and the detected temperature decreases.

Next, the power supply to the heater 42 is controlled so that the detected temperature reaches the target temperature with the pressure roller 45 rotating at the first speed.

Next, the power supply to the motor 47 is controlled so that the pressure roller 45 rotates at a second speed faster than the first speed. Thus, the rotational speed of the fixing member 41 increases, and the detected temperature decreases. It is noted that the second speed is the rotational speed of the pressure roller 45 during printing.

Next, the power supply to the heater 42 is controlled so that the detected temperature reaches the target temperature with the pressure roller 45 rotating at the second speed.

Finally, a second signal indicating that the warm-up step has been completed is input to the conveyance control portion 61. In response to the input of the second signal, the conveyance control portion 61 executes the first conveyance process of the continuously executed conveyance processes.

The temperature maintenance step is a step of maintaining the detected temperature within the specific range. The temperature maintenance step is performed following the warm-up step.

Specifically, in the temperature maintenance step, when the detected temperature exceeds the target temperature, the power supply to the heater 42 is stopped or supplied power is reduced. When the detected temperature falls below the target temperature, the power supply to the heater 42 is restarted or supplied power is increased.

The operation stop step is a step of stopping the operation of the fixing part 4. The operation stop step is executed when a third signal providing an instruction to end the execution of the driving control is input from the conveyance control portion 61 during execution of the temperature maintenance step.

Specifically, in the operation stop step, the power supply to the heater 42 is stopped, and the rotation of the pressure roller 45 is stopped after a predetermined time has elapsed from the power supply stop.

Meanwhile, in a conventional image forming apparatus, an adjustment process of adjusting the formation conditions of the transferred sheet may be executed during continuous printing. When the adjustment process is executed, execution of the next conveyance process is restricted until the adjustment process is completed.

Here, when the adjustment process is executed in the configuration in which the driving of the heater 42 is controlled using the temperature sensor 46 provided apart from the contact position P1, the conveyance process may not be able to be executed in a fixed cycle due to the restriction on the execution of the conveyance process caused by the execution of the adjustment process. In this case, when the continuous execution of the conveyance processes is continued, the fixing temperature may deviate from the control range and the image quality of the printed image may deteriorate.

In contrast, the image forming apparatus 100 according to the embodiment of the present disclosure can suppress the deterioration in image quality caused by instability of the fixing temperature, as will be described below.

The adjustment processing portion 63 executes the adjustment process and restricts execution of the conveyance process until the adjustment process is completed.

Specifically, the adjustment process includes a developing bias voltage adjustment process of adjusting the developing bias voltage applied to the developing roller 33A.

For example, in the image forming apparatus 100, a specific toner image corresponding to a predetermined inspection image is formed on the intermediate transfer belt 26 when the conveyance process is executed. In addition, in the image forming apparatus 100, the density of the specific toner image is detected by the density sensor 28. The adjustment processing portion 63 executes the developing bias voltage adjustment process when the density of the specific toner image detected by the density sensor 28 is outside a predetermined allowable range.

In addition, the adjustment process includes a toner replacement process of replacing the toner stored in the developing device 33. Specifically, in the toner replacement process, toner is replenished from the toner container 33B (see FIG. 1) to the developing device 33, and toner stored in the developing device 33 is supplied to the photoconductor drum 31. Thus, it is possible to avoid toner excessively charged in the developing device 33 from being used for image formation.

For example, the adjustment processing portion 63 executes the toner replacement process when the number of continuously executed conveyance processes that form a toner image with a print ratio equal to or less than a predetermined threshold reaches a predetermined specific number.

In addition, the adjustment processing portion 63 restricts execution of the conveyance process by means of a predetermined specific register provided in the first control portion 8. For example, when restricting execution of the conveyance process, the adjustment processing portion 63 stores restriction information to that effect in the specific register. In addition, when lifting the execution restriction on the conveyance process, the adjustment processing portion 63 removes the restriction information from the specific register.

It is noted that the adjustment process may include a charging voltage adjustment process of adjusting the charging voltage applied to the charging roller 32. In addition, the adjustment process may include a primary transfer voltage adjustment process of adjusting the primary transfer voltage applied to the primary transfer roller 34. In addition, the adjustment process may include a secondary transfer voltage adjustment process of adjusting the secondary transfer voltage applied to the secondary transfer roller 27. In addition, the adjustment process may include a process different from the above-described processes.

When the execution timing of the next conveyance process arrives in a state where the execution of the conveyance process is restricted by the adjustment processing portion 63, the conveyance control portion 61 withholds the execution of the next conveyance process until the restriction is lifted.

[Configuration of Second Control Portion 9]

Next, a configuration of the second control portion 9 will be described in more detail with reference to FIG. 2.

As shown in FIG. 2, the second control portion 9 includes a stop processing portion 71 and a restart processing portion 72.

Specifically, the ROM 12 of the second control portion 9 stores in advance print control programs for causing the CPU 11 of the second control portion 9 to function as the respective portions described above. By executing the print control programs stored in the ROM 12, the CPU 11 of the second control portion 9 functions as the stop processing portion 71 and the restart processing portion 72.

It is noted that the print control programs may be recorded on a computer-readable recording medium such as a CD, a DVD, or a flash memory, and may be read from the recording medium and stored in a storage device such as the storage portion 7. In addition, the stop processing portion 71 and the restart processing portion 72 may be composed of an electronic circuit such as an integrated circuit (ASIC). In addition, the second control portion 9 may include part or all of the conveyance control portion 61, the driving control portion 62, and the adjustment processing portion 63. In this case, the functions of the conveyance control portion 61, the driving control portion 62, and the adjustment processing portion 63 may be realized by the CPU 11.

The stop processing portion 71 stops the continuous execution of the conveyance processes by the conveyance control portion 61 when the execution restriction on the conveyance process by the adjustment processing portion 63 continues beyond an allowable limit timing that is the execution timing of the conveyance process or thereafter.

For example, the allowable limit timing is a timing at which an elapsed time from the execution timing of the conveyance process reaches a predetermined specific time. It is noted that the allowable limit timing may be the same timing as the execution timing of the conveyance process.

Specifically, the stop processing portion 71 determines whether or not the execution restriction on the conveyance process by the adjustment processing portion 63 continues beyond the allowable limit timing based on the elapsed time from a reference timing that is the start time of the conveyance process or thereafter.

For example, the reference timing is the same timing as the start of the conveyance process. It is noted that the reference timing may be a timing at which the formation of the toner image on the intermediate transfer belt 26 is completed in the conveyance process. In addition, the reference timing may be a timing at which the transfer of the toner image transferred to the intermediate transfer belt 26 to the sheet is completed.

In addition, the stop processing portion 71 stops the continuous execution of the conveyance processes by the conveyance control portion 61 before the next toner image is formed.

It is noted that the stop processing portion 71 may determine whether or not the execution restriction on the conveyance process by the adjustment processing portion 63 continues beyond the allowable limit timing based on the type of the adjustment process. For example, the stop processing portion 71 may determine whether or not the execution restriction on the conveyance process by the adjustment processing portion 63 continues beyond the allowable limit timing by using first table data prepared in advance in which the type of the adjustment process is associated with information indicating whether or not the execution restriction continues beyond the allowable limit timing. In addition, the stop processing portion 71 may determine whether or not the execution restriction on the conveyance process by the adjustment processing portion 63 continues beyond the allowable limit timing by using second table data prepared in advance in which the type of the adjustment process is associated with an execution time of the adjustment process.

In addition, the stop processing portion 71 may stop the continuous execution of the conveyance processes by the conveyance control portion 61 that is the start time of formation of the next toner image.

Here, when the continuous execution of the conveyance processes is stopped by the stop processing portion 71, the driving control portion 62 ends the driving control.

For example, the conveyance control portion 61 inputs the third signal to the driving control portion 62 when the continuous execution of the conveyance processes is stopped by the stop processing portion 71. The driving control portion 62 thereby ends the execution of the driving control.

It is noted that, when executing the conveyance process after the execution timing of the conveyance process, the conveyance control portion 61 may advance the execution timing of one or more of conveyance processes to be executed thereafter in accordance with the amount of delay in the start time of the conveyance process. For example, when executing the conveyance process after the execution timing of the conveyance process, the conveyance control portion 61 may advance the execution timing of the conveyance process to be executed next by the amount of delay in the start time of the conveyance process.

When the continuous execution of the conveyance processes is stopped by the stop processing portion 71, the restart processing portion 72 restarts the continuous execution of the conveyance processes after the execution restriction on the conveyance process is lifted.

Here, the driving control portion 62 starts the driving control when the continuous execution of the conveyance processes is restarted by the restart processing portion 72.

For example, the conveyance control portion 61 inputs the first signal to the driving control portion 62 when the continuous execution of the conveyance processes is restarted by the restart processing portion 72. Thus, the driving control portion 62 starts execution of the driving control.

It is noted that the second control portion 9 may not include the restart processing portion 72. In this case, the conveyance control portion 61 may restart the continuous execution of the conveyance processes in response to a predetermined user operation.

[Print Control Processing]

Figure 6:
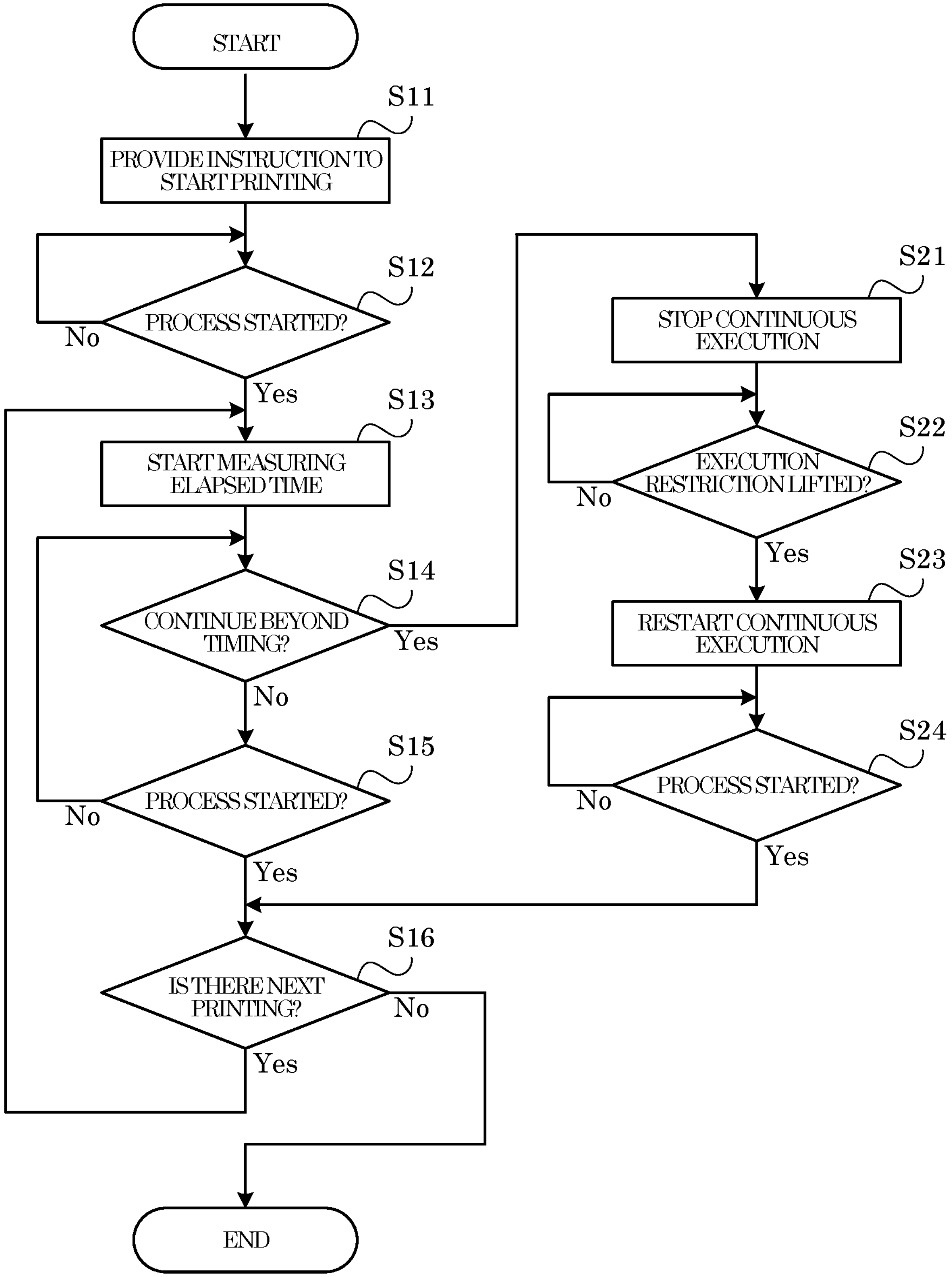
FIG. 6 is a flowchart showing an example of print control processing executed in the image forming apparatus according to the embodiment of the present disclosure.

An example of the procedure of print control processing executed by the second control portion 9 in the image forming apparatus 100 will be described below with reference to FIG. 6. Here, steps S11, S12, . . . represent the numbers of the processing procedure (steps) executed by the second control portion 9. It is noted that the print control processing is executed when an instruction to execute continuous printing processing for sequentially forming images on a plurality of sheets is input. Data on a plurality of images to be printed in the continuous printing processing is stored in the storage portion 7 in advance.

<Step S11>

First, in step S11, the second control portion 9 instructs the conveyance control portion 61 to start printing. Thus, the conveyance control portion 61 starts execution of conveyance control processing (see FIG. 7) to be described later.

<Step S12>

In step S12, the second control portion 9 determines whether or not execution of the conveyance process has been started by the conveyance control portion 61.

Specifically, when being notified by the conveyance control portion 61 of the start of execution of the conveyance process, the second control portion 9 determines that execution of the conveyance process has been started.

Here, when the second control portion 9 determines that execution of the conveyance process has been started (Yes side of S12), the second control portion 9 shifts the processing to step S13. When execution of the conveyance process has not been started (No side of S12), the second control portion 9 waits for execution of the conveyance process to be started in step S12.

<Step S13>

In step S13, the second control portion 9 starts measuring the elapsed time from the start of the execution of the conveyance process.

<Step S14>

In step S14, the second control portion 9 determines whether or not execution restriction on the conveyance process by the adjustment processing portion 63 continues beyond the allowable limit timing.

Specifically, when the elapsed time being measured exceeds the sum of the reference time and the specific time, the second control portion 9 determines that the execution restriction on the conveyance process continues beyond the allowable limit timing.

Here, when the second control portion 9 determines that the execution restriction of the conveyance process continues beyond the allowable limit timing (Yes side of S14), the second control portion 9 shifts the processing to step S21. In addition, when the execution restriction on the conveyance process does not continue beyond the allowable limit timing (No side of S14), the second control portion 9 shifts the processing to step S15.

<Step S15>

In step S15, the second control portion 9 determines whether or not execution of the conveyance process has been started by the conveyance control portion 61, as in step S12.

Here, when the second control portion 9 determines that execution of the conveyance process has been started (Yes side of S15), the second control portion 9 stops the measurement of the elapsed time and shifts the processing to step S16. In addition, when execution of the conveyance process has not been started (No side of S15), the second control portion 9 shifts the processing to step S14.

<Step S16>

In step S16, the second control portion 9 determines whether or not data on an image to be printed next is stored in the storage portion 7.

Here, when the second control portion 9 determines that data on an image to be printed next is stored in the storage portion 7 (Yes side of S16), the second control portion 9 shifts the processing to step S13. In addition, when data on an image to be printed next is not stored in the storage portion 7 (No side of S16), the second control portion 9 ends the print control processing.

<Step S21>

In step S21, the second control portion 9 stops the continuous execution of the conveyance processes by the conveyance control portion 61. Here, the process in step S21 is an example of the stop step of the present disclosure, and is executed by the stop processing portion 71 of the second control portion 9.

Specifically, the second control portion 9 instructs the conveyance control portion 61 to stop the continuous execution of the conveyance processes. In addition, the second control portion 9 stops the measurement of the elapsed time.

In addition, the second control portion 9 stops the continuous execution of the conveyance processes by the conveyance control portion 61 before the next toner image is formed.

<Step S22>

In step S22, the second control portion 9 determines whether or not the execution restriction on the conveyance process has been lifted.

Specifically, when the restriction information is removed from the specific register of the first control portion 8, the second control portion 9 determines that the execution restriction on the conveyance process has been lifted.

Here, when the second control portion 9 determines that the execution restriction on the conveyance process has been lifted (Yes side of S22), the second control portion 9 shifts the processing to step S23. When the execution restriction on the conveyance process has not been lifted (No side of S22), the second control portion 9 waits for the lifting of the execution restriction on the conveyance process in step S22.

<Step S23>

In step S23, the second control portion 9 restarts the continuous execution of the conveyance processes by the conveyance control portion 61. Here, the process in step S23 is executed by the restart processing portion 72 of the second control portion 9.

Specifically, the second control portion 9 instructs the conveyance control portion 61 to restart the continuous execution of the conveyance processes.

<Step S24>

In step S24, the second control portion 9 determines whether or not execution of the conveyance process has been started by the conveyance control portion 61, as in step S12.

Here, when the second control portion 9 determines that execution of the conveyance process has been started (Yes side of S24), the second control portion 9 shifts the processing to step S16. When execution of the conveyance process has not been started (No side of S24), the second control portion 9 waits for execution of the conveyance process to be started in step S24.

[Conveyance Control Processing]

Figure 7:
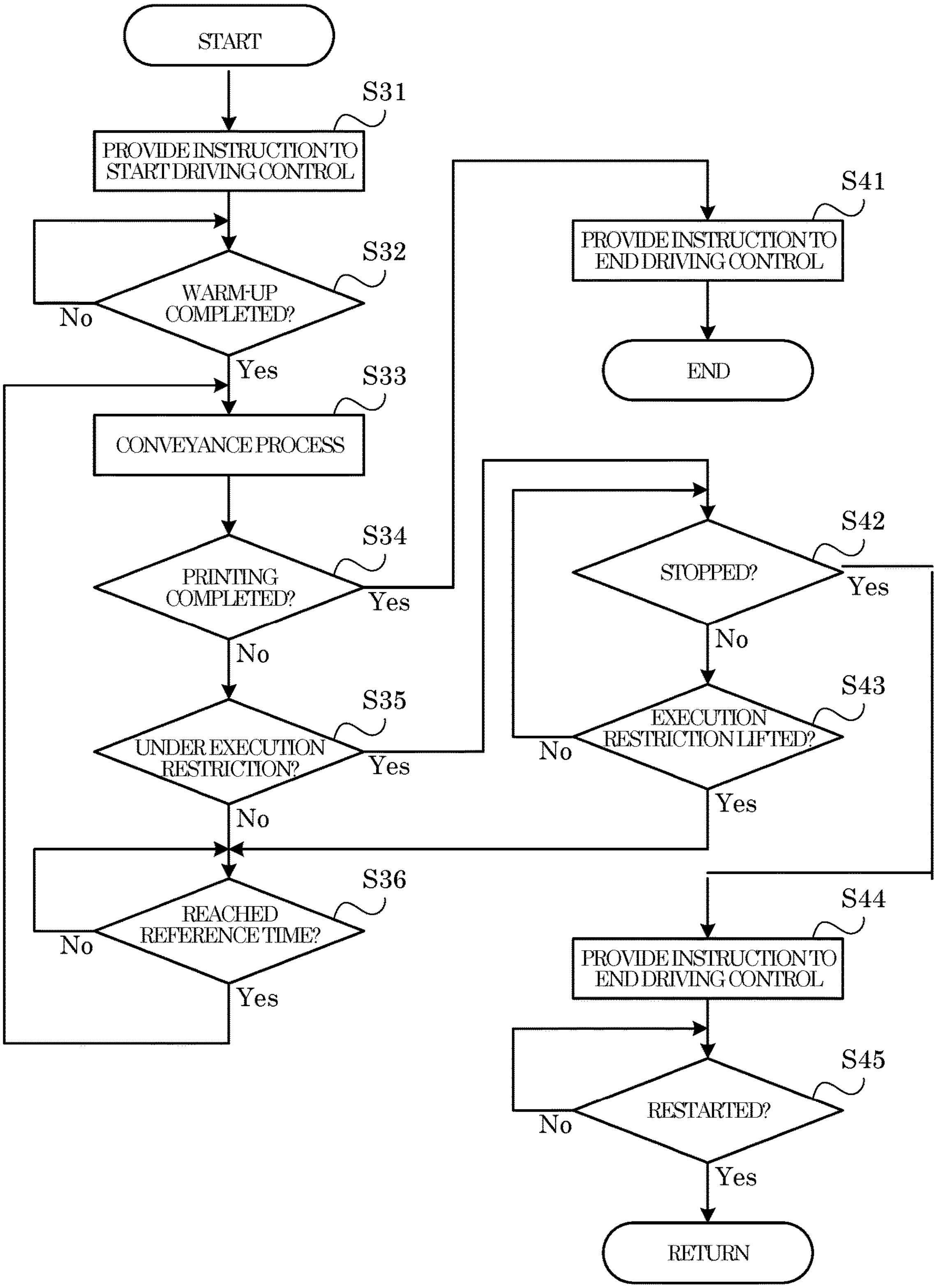
FIG. 7 is a flowchart showing an example of conveyance control processing executed in the image forming apparatus according to the embodiment of the present disclosure.

Next, an example of the procedure of conveyance control processing executed by the conveyance control portion 61 in the image forming apparatus 100 will be described with reference to FIG. 7. It is noted that the conveyance control processing is executed when an instruction to start printing is provided from the second control portion 9 in step S11 of the print control processing. The conveyance control processing is an example of the conveyance control step of the present disclosure.

<Step S31>

First, in step S31, the conveyance control portion 61 instructs the driving control portion 62 to start the driving control.

Specifically, the conveyance control portion 61 inputs the first signal to the driving control portion 62.

<Step S32>

In step S32, the conveyance control portion 61 determines whether or not the warm-up step has been completed.

Specifically, when the second signal is input from the driving control portion 62, the conveyance control portion 61 determines that the warm-up step has been completed.

Here, when the conveyance control portion 61 determines that the warm-up step has been completed (Yes side of S32), the conveyance control portion 61 shifts the processing to step S33. In addition, when the warm-up step has not been completed (No side of step S32), the conveyance control portion 61 waits for completion of the warm-up step in step S32.

<Step S33>

In step S33, the conveyance control portion 61 executes the conveyance process.

Specifically, the conveyance control portion 61 reads image data to be printed stored in the storage portion 7, and forms a toner image based on the image data on the intermediate transfer belt 26. In addition, the conveyance control portion 61 transfers the toner image formed on the intermediate transfer belt 26 to a sheet, and conveys the sheet on which the toner image has been transferred (the transferred sheet) to the contact position P1.

In addition, the conveyance control portion 61 notifies the second control portion 9 of the start of execution of the conveyance process. In addition, the conveyance control portion 61 measures the elapsed time from the start of execution of the conveyance process.

<Step S34>

In step S34, the conveyance control portion 61 determines whether or not printing has been completed.

Specifically, when image data to be printed does not remain in the storage portion 7, the conveyance control portion 61 determines that printing has been completed.

Here, when the conveyance control portion 61 determines that printing has been completed (Yes side of S34), the conveyance control portion 61 shifts the processing to step S41. In addition, when printing has not been completed (No side of S34), the conveyance control portion 61 shifts the processing to step S35.

<Step S35>

In step S35, the conveyance control portion 61 determines whether or not execution of the conveyance process is restricted by the adjustment processing portion 63.

Specifically, when the restriction information is stored in the specific register of the first control portion 8, the conveyance control portion 61 determines that execution of the conveyance process is restricted.

Here, when the conveyance control portion 61 determines that execution of the conveyance process is restricted (Yes side of S35), the conveyance control portion 61 shifts the processing to step S42. In addition, when execution of the conveyance process is not restricted (No side of S35), the conveyance control portion 61 shifts the processing to step S36.

<Step S36>

In step S36, the conveyance control portion 61 determines whether or not the elapsed time from the execution of the conveyance process has reached the reference time.

Here, when the conveyance control portion 61 determines that the elapsed time from the execution of the conveyance process has reached the reference time (Yes side of S36), the conveyance control portion 61 shifts the processing to step S33. In addition, when the elapsed time from the execution of the conveyance process has not reached the reference time (No side of S36), the conveyance control portion 61 waits for the elapsed time from the execution of the conveyance process to reach the reference time in step S36.

<Step S41>

In step S41, the conveyance control portion 61 instructs the driving control portion 62 to end the driving control.

Specifically, the conveyance control portion 61 inputs the third signal to the driving control portion 62.

<Step S42>

In step S42, the conveyance control portion 61 determines whether or not an instruction to stop the continuous execution of the conveyance processes has been received from the second control portion 9.

Here, when the conveyance control portion 61 determines that an instruction to stop the continuous execution of the conveyance processes has been received (Yes side of S42), the conveyance control portion 61 shifts the processing to step S44. In addition, when an instruction to stop the continuous execution of the conveyance processes has not been received (No side of S42), the conveyance control portion 61 shifts the processing to step S43.

<Step S43>

In step S43, the conveyance control portion 61 determines whether or not the execution restriction on the conveyance process has been lifted.

Specifically, when the restriction information is removed from the specific register of the first control portion 8, the conveyance control portion 61 determines that the execution restriction on the conveyance process has been lifted.

Here, when the conveyance control portion 61 determines that the execution restriction on the conveyance process has been lifted (Yes side of S43), the conveyance control portion 61 shifts the processing to step S36. In addition, when the execution restriction on the conveyance process has not been lifted (No side of S43), the conveyance control portion 61 shifts the processing to step S42.

<Step S44>

In step S44, the conveyance control portion 61 instructs the driving control portion 62 to end the driving control, as in step S41.

<Step S45>

In step S45, the conveyance control portion 61 determines whether or not an instruction to restart the continuous execution of the conveyance processes has been received from the second control portion 9.

Here, when the conveyance control portion 61 determines that an instruction to restart the continuous execution of the conveyance processes has been received from the second control portion 9 (Yes side of S45), the conveyance control portion 61 shifts the processing to step S31. When an instruction to restart the continuous execution of the conveyance processes has not been received (No side of S45), the conveyance control portion 61 waits for an instruction to restart the continuous execution of the conveyance processes in step S45.

[Driving Control Processing]

Figure 8:
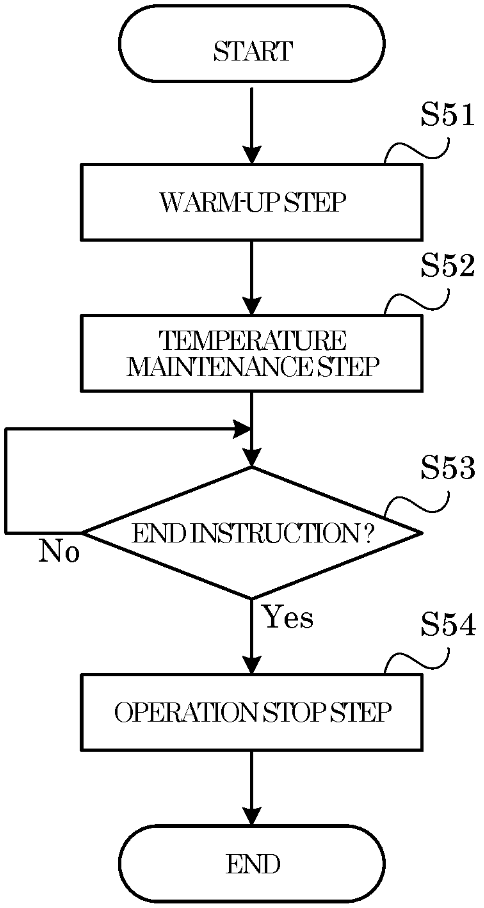
FIG. 8 is a flowchart showing an example of driving control processing executed in the image forming apparatus according to the embodiment of the present disclosure.

Next, an example of the procedure of driving control processing executed by the driving control portion 62 in the image forming apparatus 100 will be described with reference to FIG. 8. It is noted that the driving control processing is executed when an instruction to start the driving control is provided from the conveyance control portion 61 in step S31 of the conveyance control processing. The driving control processing is an example of the driving control step of the present disclosure.

<Step S51>

First, in step S51, the driving control portion 62 executes the warm-up step.

<Step S52>

In step S52, the driving control portion 62 executes the temperature maintenance step.

<Step S53>

In step S53, the driving control portion 62 determines whether or not an instruction to end the driving control has been received from the conveyance control portion 61.

Here, when the driving control portion 62 determines that an instruction to end the driving control has been received from the conveyance control portion 61 (Yes side of S53), the driving control portion 62 shifts the processing to step S54. In addition, when an instruction to end the driving control has not been received from the conveyance control portion 61 (No side of S53), the driving control portion 62 waits for an instruction to end the driving control in step S53.

<Step S54>

In step S54, the driving control portion 62 executes the operation stop step.

[Operation Condition Adjustment Processing]

Figure 9:
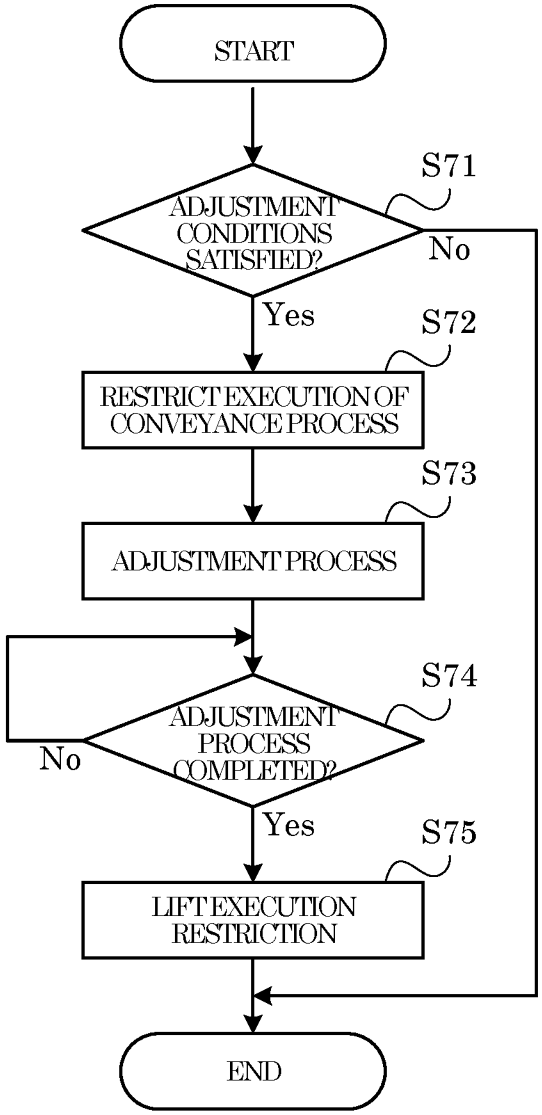
FIG. 9 is a flowchart showing an example of operation condition adjustment processing executed in the image forming apparatus according to the embodiment of the present disclosure.

Next, an example of the procedure of operation condition adjustment processing executed by the adjustment processing portion 63 in the image forming apparatus 100 will be described with reference to FIG. 9. For example, the operation condition adjustment processing is executed at a timing when the transfer of the toner image transferred to the intermediate transfer belt 26 to the sheet is completed. The operation condition adjustment processing is an example of the adjustment step of the present disclosure.

<Step S71>

First, in step S71, the adjustment processing portion 63 determines whether or not predetermined adjustment conditions have been satisfied.

Specifically, when the density of the specific toner image detected by the density sensor 28 is outside the allowable range, the adjustment processing portion 63 determines that a first adjustment condition of the adjustment conditions has been satisfied. In addition, the adjustment processing portion 63 determines that a second adjustment condition of the adjustment conditions has been satisfied when the number of continuously executed conveyance processes that form a toner image with a print ratio equal to or less than the threshold has reached the specific number.

Here, when the adjustment processing portion 63 determines that the adjustment conditions have been satisfied (Yes side of S71), the adjustment processing portion 63 shifts the processing to step S72. When the adjustment conditions have not been satisfied (No side of S71), the adjustment processing portion 63 ends the operation condition adjustment processing.

The operation condition adjustment processing may be executed at any timing that enables determination of whether or not the adjustment conditions have been satisfied.

<Step S72>

In step S72, the adjustment processing portion 63 restricts execution of the conveyance process.

Specifically, the adjustment processing portion 63 stores the restriction information in the specific register of the first control portion 8.

<Step S73>

In step S73, the adjustment processing portion 63 executes the adjustment process.

Specifically, when the first adjustment condition has been satisfied, the adjustment processing portion 63 executes the developing bias voltage adjustment process. When the second adjustment condition has been satisfied, the adjustment processing portion 63 executes the toner replacement process.

<Step S74>

In step S74, the adjustment processing portion 63 determines whether or not the adjustment process has been completed.

Here, when the adjustment processing portion 63 determines that the adjustment process has been completed (Yes side of S74), the adjustment processing portion 63 shifts the processing to step S75. When the adjustment process has not been completed (No side of S74), the adjustment processing portion 63 waits for the completion of the adjustment process in step S74.

<Step S75>

In step S75, the adjustment processing portion 63 lifts the execution restriction on the conveyance process.

Specifically, the adjustment processing portion 63 removes the restriction information from the specific register of the first control portion 8.

As described above, in the image forming apparatus 100, when the start of execution of the conveyance process is delayed beyond the allowable limit timing due to the execution restriction on the conveyance process caused by the execution of the adjustment process, the continuous execution of the conveyance processes by the conveyance control portion 61 is stopped. This makes it possible to suppress the deviation of the fixing temperature from the control range that occurs when continuous execution of the conveyance processes is continued. Accordingly, it is possible to suppress the deterioration in image quality caused by instability of the fixing temperature.

It is noted that the target temperature may be determined in advance for each of the sizes of the sheets used for printing.

In addition, the fixing member 41 is not limited to the endless belt-like member, but may be a roller-like member.

In addition, the temperature sensor 46 may be provided at a different position than the second surface 42B of the heater 42. In this case, the heater 42 may not be formed in a plate-like shape.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

an image forming portion configured to form a transferred sheet to which a toner image has been transferred;

a fixing member provided separately from the image forming portion and configured to come into contact with a toner image transfer surface of the transferred sheet, and fix the toner image on the transferred sheet;

a heater configured to heat the fixing member;

a temperature sensor configured to detect a temperature at a detection position separated from a contact position between the fixing member and the transfer surface;

a conveyance control portion configured to execute a conveyance process of conveying the transferred sheet to the contact position in a predetermined execution cycle;

a driving control portion configured to control driving of the heater so that the temperature detected by the temperature sensor matches a target temperature set based on the execution cycle;

an adjustment processing portion configured to execute an adjustment process of adjusting a condition for formation of the transferred sheet by the image forming portion and restrict the execution of the conveyance process until the adjustment process is completed; and a stop processing portion configured to stop continuous execution of the conveyance process by the conveyance control portion when the restriction on the execution of the conveyance process by the adjustment processing portion continues beyond an allowable limit timing that is an execution timing of the conveyance process or thereafter, wherein the driving control portion ends the driving control of the heater when the continuous execution of the conveyance process is stopped by the stop processing portion, the image forming apparatus comprises a restart processing portion configured to restart the continuous execution of the conveyance process by the conveyance control portion after lifting of the restriction on the execution of the conveyance process when the continuous execution of the conveyance process is stopped by the stop processing portion, and the driving control portion starts the driving control of the heater when the continuous execution of the conveyance process is restarted by the restart processing portion.

2. The image forming apparatus according to claim 1, wherein the stop processing portion stops the continuous execution of the conveyance process by the conveyance control portion before a next toner image is formed.

3. The image forming apparatus according to claim 1, wherein the stop processing portion determines, based on an elapsed time from a reference timing that is a start time of the conveyance process or thereafter, whether or not the restriction on the execution of the conveyance process by the adjustment processing portion continues beyond the allowable limit timing.

4. The image forming apparatus according to claim 1, wherein the fixing member includes an endless belt-shaped member.

5. The image forming apparatus according to claim 4, wherein the heater has a plate-like shape and is provided in contact with an inner peripheral surface of the fixing member at a position facing, with the fixing member interposed therebetween, the transferred sheet passing through the contact position, the temperature sensor is provided on a second surface of the heater opposite to a first surface of the heater in contact with the inner peripheral surface of the fixing member, and detects a temperature at an arrangement position, and the detection position includes the arrangement position of the temperature sensor.

6. The image forming apparatus according to claim 1, wherein the target temperature is determined in advance for each size of the sheet.

7. An image forming method executed by an image forming apparatus including:

an image forming portion configured to form a transferred sheet to which a toner image has been transferred; a fixing member provided separately from the image forming portion and configured to come into contact with a toner image transfer surface of the transferred sheet, and fix the toner image on the transferred sheet; a heater configured to heat the fixing member; a temperature sensor configured to detect a temperature at a detection position separated from a contact position between the fixing member and the transfer surface, the method comprising:

a conveyance control step of executing a conveyance process of conveying the transferred sheet to the contact position in a predetermined execution cycle;

a driving control step of controlling driving of the heater so that the temperature detected by the temperature sensor matches a target temperature set based on the execution cycle;

an adjustment step of executing an adjustment process of adjusting a condition for formation of the transferred sheet by the image forming portion and restricting the execution of the conveyance process until the adjustment process is completed; and a stop step of stopping continuous execution of the conveyance process by the conveyance control step when the restriction on the execution of the conveyance process by the adjustment step continues beyond an allowable limit timing that is an execution timing of the conveyance process or thereafter, wherein in the driving control step, the driving control of the heater is ended when the continuous execution of the conveyance process is stopped by the stop step, the image forming method comprises a restart step of restarting the continuous execution of the conveyance process by the conveyance control step after lifting of the restriction on the execution of the conveyance process when the continuous execution of the conveyance process is stopped by the stop step, and in the driving control step, the driving control of the heater is started when the continuous execution of the conveyance process is restarted by the restart step.

8. An image forming apparatus comprising:

a fixing member configured to come into contact with a toner image transfer surface of a transferred sheet to which a toner image has been transferred, and fix the toner image on the transferred sheet;

a heater configured to heat the fixing member;

a temperature sensor configured to detect a temperature at a detection position separated from a contact position between the fixing member and the transfer surface;

a conveyance control portion configured to execute a conveyance process of conveying the transferred sheet to the contact position in a predetermined execution cycle;

a driving control portion configured to control driving of the heater so that the temperature detected by the temperature sensor matches a target temperature set based on the execution cycle;

an adjustment processing portion configured to execute an adjustment process of adjusting a formation condition of the transferred sheet and restrict the execution of the conveyance process until the adjustment process is completed; and a stop processing portion configured to stop continuous execution of the conveyance process by the conveyance control portion when the restriction on the execution of the conveyance process by the adjustment processing portion continues beyond an allowable limit timing that is an execution timing of the conveyance process or thereafter, wherein the driving control portion ends the driving control of the heater when the continuous execution of the conveyance process is stopped by the stop processing portion, the image forming apparatus comprises a restart processing portion configured to restart the continuous execution of the conveyance process by the conveyance control portion after lifting of the restriction on the execution of the conveyance process when the continuous execution of the conveyance process is stopped by the stop processing portion, and the driving control portion starts the driving control of the heater when the continuous execution of the conveyance process is restarted by the restart processing portion.

9. An image forming apparatus comprising:

a fixing member configured to come into contact with a toner image transfer surface of a transferred sheet to which a toner image has been transferred, and fix the toner image on the transferred sheet;

a heater configured to heat the fixing member;

a temperature sensor configured to detect a temperature at a detection position separated from a contact position between the fixing member and the transfer surface;

a conveyance control portion configured to execute a conveyance process of conveying the transferred sheet to the contact position in a predetermined execution cycle;

a driving control portion configured to control driving of the heater so that the temperature detected by the temperature sensor matches a target temperature set based on the execution cycle;

an adjustment processing portion configured to execute an adjustment process of adjusting a formation condition of the transferred sheet and restrict the execution of the conveyance process until the adjustment process is completed; and a stop processing portion configured to stop continuous execution of the conveyance process by the conveyance control portion when the restriction on the execution of the conveyance process by the adjustment processing portion continues beyond an allowable limit timing that is an execution timing of the conveyance process or thereafter, wherein the fixing member includes an endless belt-shaped member, the heater has a plate-like shape and is provided in contact with an inner peripheral surface of the fixing member at a position facing, with the fixing member interposed therebetween, the transferred sheet passing through the contact position, the temperature sensor is provided on a second surface of the heater opposite to a first surface of the heater in contact with the inner peripheral surface of the fixing member, and detects a temperature at an arrangement position, and the detection position includes the arrangement position of the temperature sensor.

* * * * *